(12) United States Patent
Lansberry

(10) Patent No.: US 10,745,312 B2
(45) Date of Patent: Aug. 18, 2020

(54) METHOD AND APPARATUS FOR ISOPIPE SUPPORT AND SAG MITIGATION

(71) Applicant: CORNING INCORPORATED, Corning, NY (US)

(72) Inventor: Timothy L Lansberry, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 250 days.

(21) Appl. No.: 15/537,220

(22) PCT Filed: Dec. 16, 2015

(86) PCT No.: PCT/US2015/065966
§ 371 (c)(1),
(2) Date: Jun. 16, 2017

(87) PCT Pub. No.: WO2016/100432
PCT Pub. Date: Jun. 23, 2016

(65) Prior Publication Data
US 2017/0362112 A1    Dec. 21, 2017

Related U.S. Application Data

(60) Provisional application No. 62/094,345, filed on Dec. 19, 2014.

(51) Int. Cl.
*C03B 17/06* (2006.01)

(52) U.S. Cl.
CPC .................... *C03B 17/064* (2013.01)

(58) Field of Classification Search
CPC .................................... C03B 17/064
See application file for complete search history.

(56) References Cited

U.S. PATENT DOCUMENTS 3,338,696 A    8/1967    Dockerty
3,437,470 A *  4/1969    Overman .............. C03B 17/064
                                                         65/121

(Continued)

FOREIGN PATENT DOCUMENTS

CN    107108307 A    8/2017
WO    2008103249 A2  8/2008

(Continued)

OTHER PUBLICATIONS

International Search Report and Written Opinion PCT/US2015/065966 dated Mar. 15, 2016.

*Primary Examiner* — Jason L Lazorcik

(57) ABSTRACT

Disclosed herein are apparatuses for producing a glass ribbon, the apparatuses comprising a forming body comprising an upper trough-shaped portion comprising two trough walls and a trough bottom; a lower wedge-shaped portion; a delivery end comprising a first recess; and a compression end comprising a second recess; and first and second supports coupled to the first and second recesses, wherein at least a portion of the first or second support surfaces are non-planar and in continuous contact with at least a portion of the respective first or second recess surfaces. Also disclosed herein are methods for producing a glass ribbon using such apparatuses.

22 Claims, 7 Drawing Sheets

(56) References Cited

U.S. PATENT DOCUMENTS

| | | | | |
|---|---|---|---|---|
| 3,519,411 A * | 7/1970 | Cortright | ............. | C03B 17/064 65/171 |
| 3,682,609 A | 8/1972 | Dockerty | | |
| 6,895,782 B2 * | 5/2005 | Pitbladdo | ............. | C03B 17/067 65/53 |
| 7,748,236 B2 * | 7/2010 | Pitbladdo | ............. | C03B 17/064 65/193 |
| 8,042,361 B2 * | 10/2011 | Pitbladdo | ............. | C03B 17/064 65/121 |
| 9,120,691 B2 * | 9/2015 | Park | ...................... | C03B 17/064 |
| 2003/0192349 A1 | 10/2003 | Meda et al. | | |
| 2005/0183455 A1 * | 8/2005 | Pitbladdo | ............. | C03B 17/064 65/29.11 |
| 2008/0202164 A1 * | 8/2008 | Hoysan | ................ | C03B 17/064 65/90 |
| 2013/0192307 A1 * | 8/2013 | Panin | .................... | C03B 17/064 65/53 |
| 2014/0318523 A1 * | 10/2014 | Schermerhorn | ......... | B28D 1/08 125/19 |

FOREIGN PATENT DOCUMENTS

| | | |
|---|---|---|
| WO | 2008140682 A1 | 11/2008 |
| WO | 2012132309 A1 | 10/2012 |

* cited by examiner

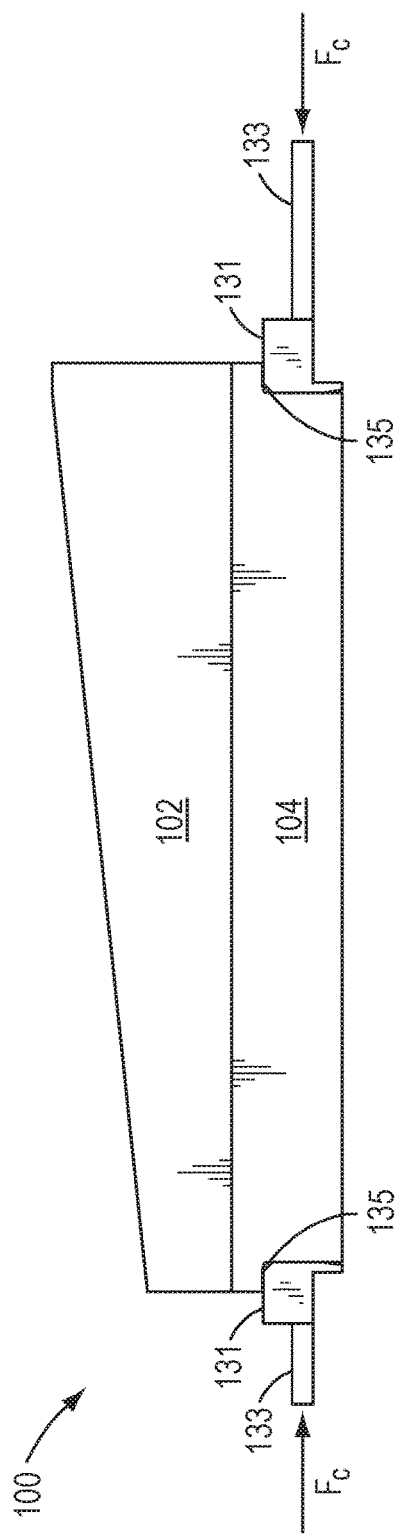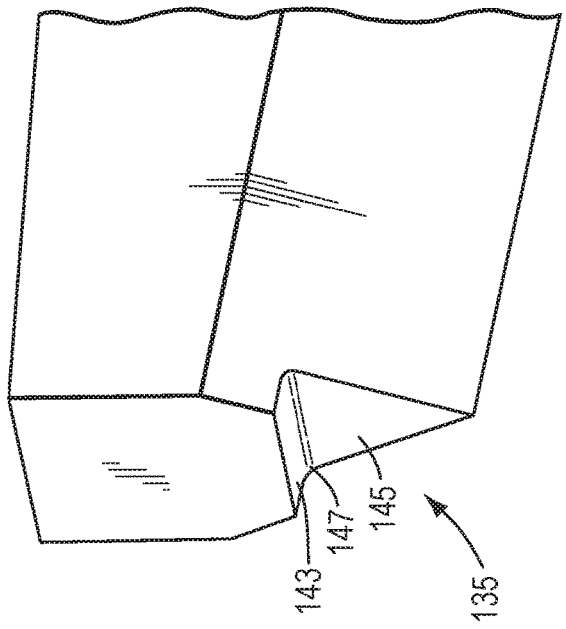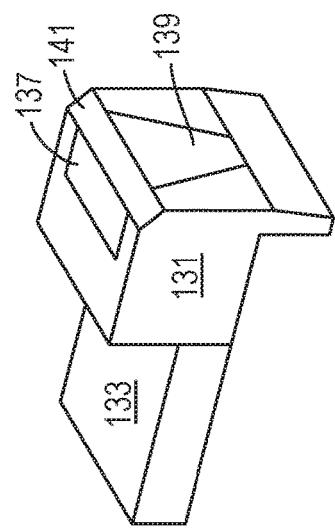

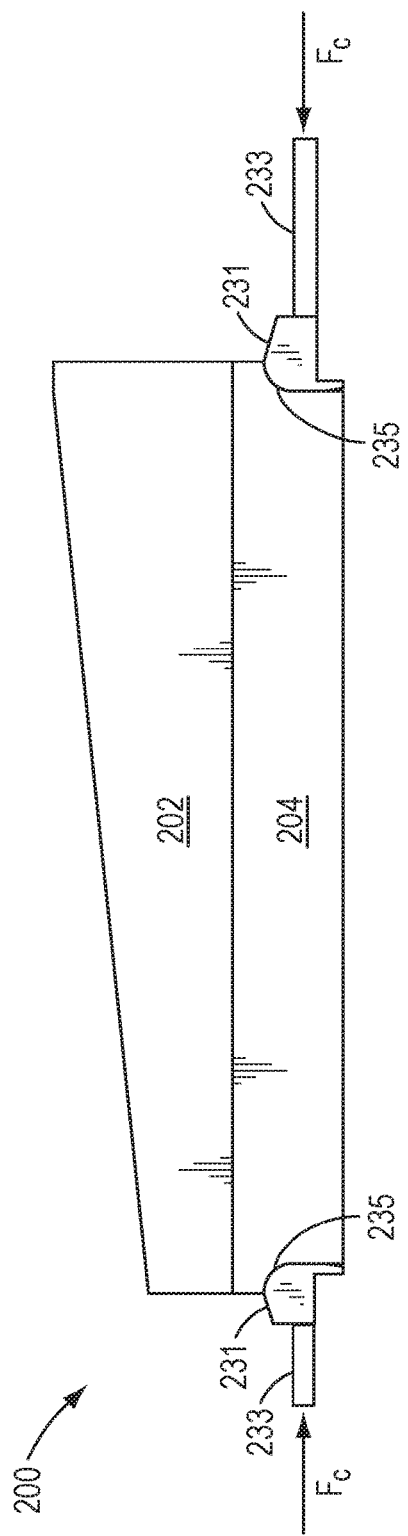
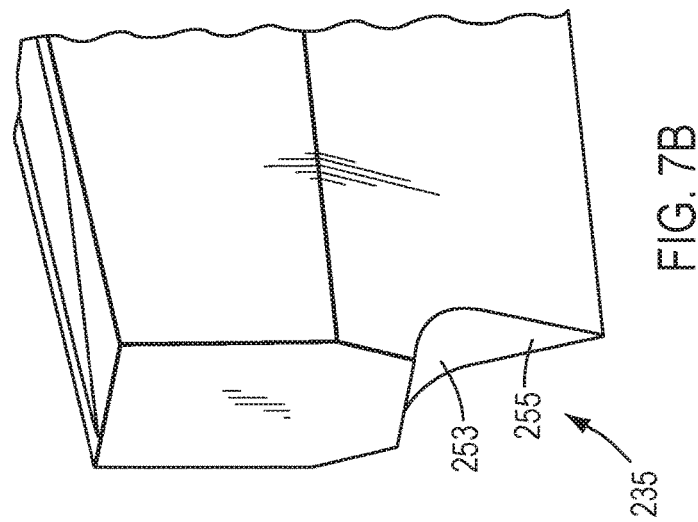
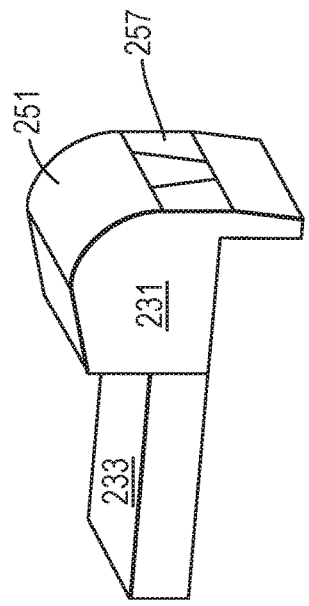
FIG. 6
FIG. 7B
FIG. 7A

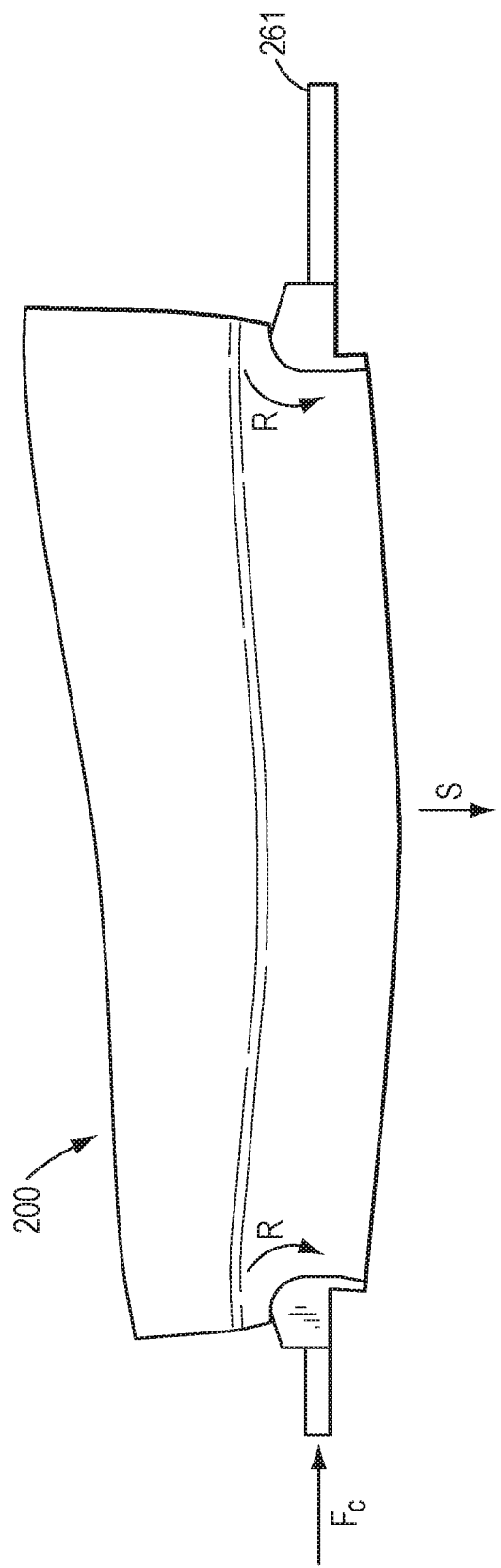

METHOD AND APPARATUS FOR ISOPIPE SUPPORT AND SAG MITIGATION

CROSS-REFERENCE TO RELATED APPLICATIONS

This application claims the benefit of priority under 35 U.S.C. § 371 of International Patent Application Serial No. PCT/US15/65966, filed on Dec. 16, 2015, which in turn, claims the benefit of priority of U.S. Provisional Patent Application Ser. No. 62/094,345 filed on Dec. 19, 2014, the contents of each of which are relied upon and incorporated herein by reference in their entireties.

FIELD OF THE DISCLOSURE

The present disclosure relates generally to forming bodies for glass manufacturing systems, and more particularly to methods and apparatuses for improved isopipe support and sag mitigation.

BACKGROUND

High-performance display devices, such as liquid crystal displays (LCDs) and plasma displays, are commonly used in various electronics, such as cell phones, laptops, electronic tablets, televisions, and computer monitors. Currently marketed display devices can employ one or more high-precision glass sheets, for example, as substrates for electronic circuit components, or as color filters, to name a few applications. The leading technology for making such high-quality glass substrates is the fusion draw process, developed by Corning Incorporated, and described, e.g., in U.S. Pat. Nos. 3,338,696 and 3,682,609, which are incorporated herein by reference in their entireties.

The fusion draw process can utilize a fusion draw machine (FDM) comprising a forming body (e.g., isopipe). The forming body can comprise an upper trough-shaped portion and a lower portion having a wedge-shaped cross-section with two major side surfaces (or forming surfaces) sloping downwardly to join at a root. During the glass forming process, the molten glass can be delivered to one end of the isopipe ("delivery end") and can travel down the length of the isopipe while flowing over the trough side walls (or weirs) to an opposite end ("compression end"). The molten glass can flow down along the two forming surfaces as two glass ribbons, which ultimately converge at the root where they fuse together to form a unitary glass ribbon. The glass ribbon can thus have two pristine external surfaces that have not been exposed to the surface of the forming body. The ribbon can then be drawn down and cooled to form a glass sheet having a desired thickness and a pristine surface quality.

Isopipes used in the fusion draw process are often large bodies formed from heavy, refractory ceramic materials. Isopipes can be subjected to rigorous operating conditions, such as high temperatures, for extended periods of continuous use, e.g., up to several years or more. During operation, the refractory body may deform (e.g., sag) in the middle, which can ultimately change the molten glass flow characteristics in the FDM. Higher temperature operations can accelerate isopipe deformation such as sag due to creep of the refractory material. Isopipe sag can be partially mitigated by applying a horizontal compression force below the isopipe neutral axis, for instance, at the ends of the lower wedge-shaped portion. However, this compression force itself creates stress in the forming body, which can lead to static fatigue of the refractory material. Stress and sag should therefore be balanced and minimized to extend the life of the forming body and/or maintain glass quality.

Consumer demand for high-performance displays with ever growing size and image quality requirements drives the need for improved manufacturing processes for producing large, high-quality, high-precision glass sheets. Larger (e.g., longer and heavier) isopipes for producing large glass sheets can have increased likelihood of failure due to sag and/or stress over time. Accordingly, it would be advantageous to provide methods and apparatuses for mitigating isopipe sag and providing improved isopipe support. In various embodiments, the methods and apparatuses disclosed herein can minimize or prevent isopipe sag and/or stress, which can extend the useful life of the forming apparatus and/or maintain high glass quality over the lifetime of the apparatus.

SUMMARY

The disclosure relates to apparatuses for producing a glass ribbon, the apparatuses comprising a forming body comprising an upper trough-shaped portion comprising two trough walls and a trough bottom; a lower wedge-shaped portion; a delivery end comprising a first recess having a first mounting surface; and a compression end comprising a second recess having a second mounting surface; a first support coupled to the first recess and comprising a first support surface; and a second support coupled to the second recess and comprising a second support surface, wherein at last a portion of the first or second support surface is non-planar and in continuous contact with at least a portion of the respective first or second mounting surface. Fusion draw machines comprising such forming body apparatuses are also disclosed herein. Further disclosed herein are methods for producing a glass ribbon, the methods comprising melting batch materials to form molten glass and introducing the molten glass into an apparatus as described herein.

In various embodiments, the forming body can comprise a refractory material chosen from zircon, zirconia, alumina, magnesium oxide, silicon carbide, silicon nitride, silicon oxynitride, xenotime, monazite, alloys thereof, and combinations thereof. According to some embodiments, the non-planar portions of the first and second support surfaces can have a substantially constant radius of curvature. In certain embodiments, the first and second support surfaces can comprise at least one planar portion. According to further embodiments, the non-planar and planar portions of the first and second support surfaces can be in continuous contact with the first and second mounting surfaces, respectively.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiserve to explain the principles and operations of the disclosure.

BRIEF DESCRIPTION OF THE DRAWINGS

The following detailed description can be best understood when read in conjunction with the following drawings, where like structures are indicated with like reference numerals where possible and in which:

FIG. 3 is a schematic showing a side view of an exemplary forming body supported by pier blocks;

FIG. 4A is a schematic showing a perspective view of an exemplary pier block;

FIG. 4B is a schematic showing a perspective view of a pier seat corresponding to the pier block of FIG. 4A;

FIG. 6 is a schematic showing a side view of a forming body supported by pier blocks according to embodiments of the disclosure;

FIG. 7A is a schematic showing a perspective view of a pier block according to embodiments of the disclosure;

FIG. 7B is a schematic showing a perspective view of a pier seat corresponding to the pier block of FIG. 7A;

FIG. 8 is a schematic showing a side view of a sagged forming body supported by pier blocks according to embodiments of the disclosure.

DETAILED DESCRIPTION

Apparatuses

Disclosed herein are apparatuses for producing a glass ribbon, the apparatuses comprising a forming body comprising an upper trough-shaped portion comprising two trough walls and a trough bottom; a lower wedge-shaped portion; a delivery end comprising a first recess having a first mounting surface; and a compression end comprising a second recess having a second mounting surface; a first support coupled to the first recess and comprising a first support surface; and a second support coupled to the second recess and comprising a second support surface, wherein at last a portion of the first or second support surface is non-planar and in continuous contact with at least a portion of the respective first or second mounting surface. Fusion draw machines comprising such apparatuses are also disclosed herein.

Figure 1:
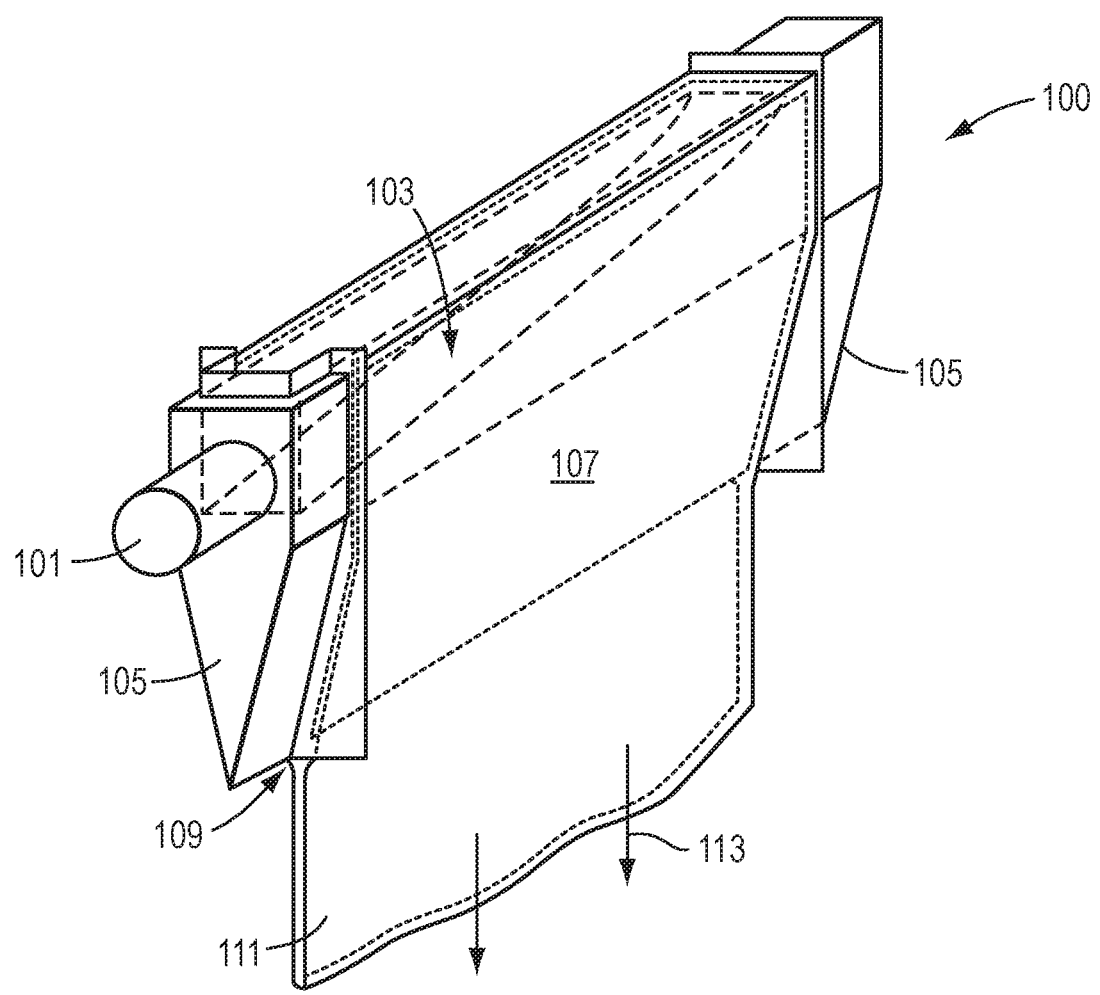
FIG. 1 is a schematic of an exemplary forming body for use in an exemplary fusion draw process for making a glass ribbon.

Embodiments of the disclosure will be discussed with reference to FIGS. 1-2, which depict an exemplary forming body, e.g., isopipe, suitable for use in an exemplary glass manufacturing process for producing a glass ribbon. Referring to FIG. 1, during a glass manufacturing process, such as a fusion draw process, molten glass can be introduced into a forming body 100 comprising a trough 103 via an inlet pipe 101. Once the trough 103 is filled completely, the molten glass can overflow over the sides of the trough and down the two opposing forming surfaces 107 before fusing together at the root 109 to form a glass ribbon 111. The glass ribbon can then be drawn down in the direction 113 using, e.g., a roller assembly (not shown) and further processed to form a glass sheet. The forming body assembly can further comprise ancillary components such as end caps 105 and/or edge directors (not shown).

Figure 2:
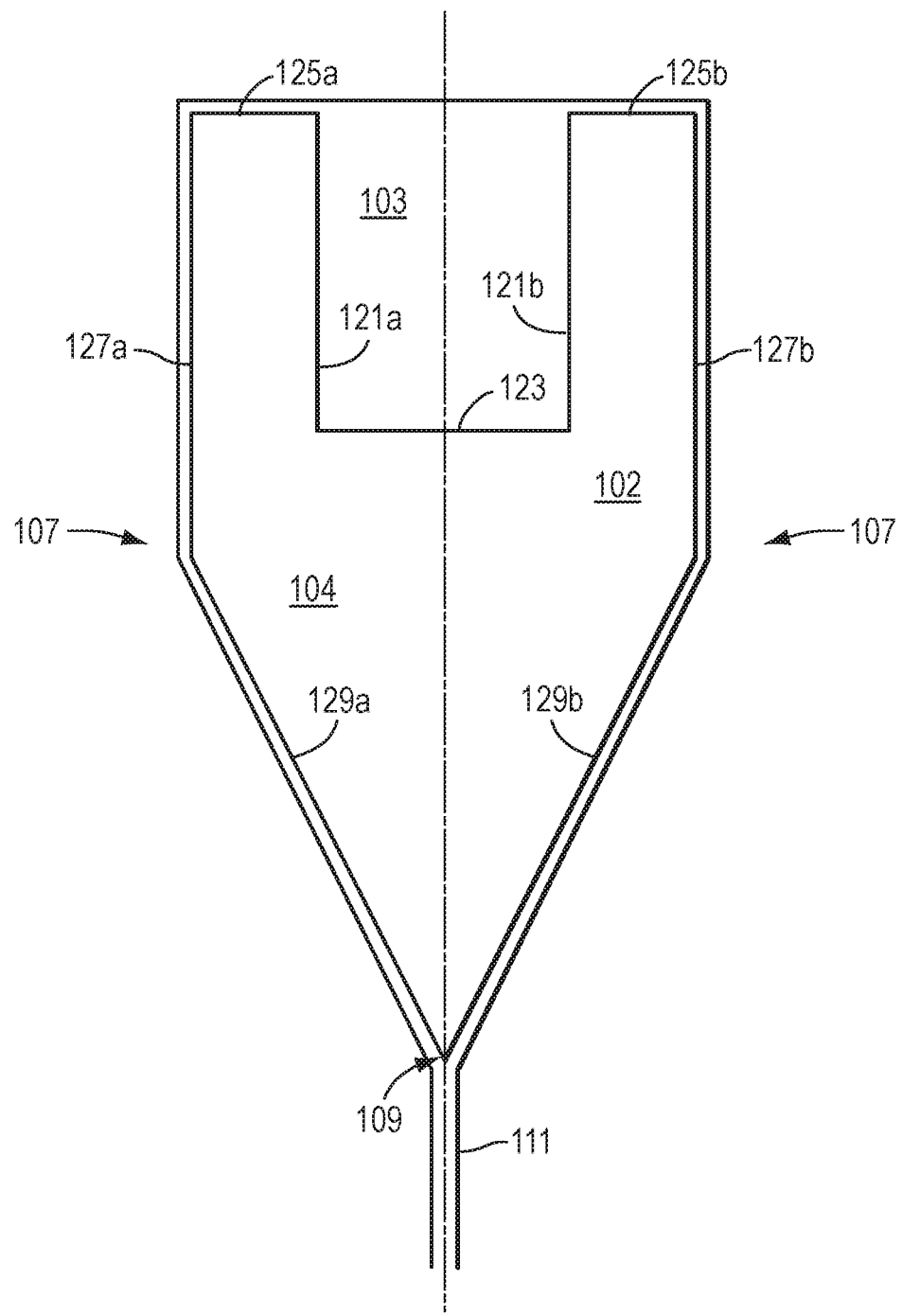
FIG. 2 is a cross-sectional view of the forming body of FIG. 1.

FIG. 2 provides a cross-sectional view of the forming body of FIG. 1, in which the forming body 100 can comprise an upper trough-shaped part 102 and a lower wedge-shaped part 104. The upper trough-shaped part 102 can comprise a channel or trough 103 configured to receive the molten glass. The trough 103 can be defined by two trough walls (or weirs) 125a, 125b comprising interior surfaces 121a, 121b, and a trough bottom 123. Although the trough is depicted as having a rectangular cross-section, with the interior surfaces forming approximately 90-degree angles with the trough bottom, other trough cross-sections are envisioned, as well as other angles between the interior surfaces and the bottom of the trough. The weirs 125a, 125b can further comprise exterior surfaces 127a, 127b which, together with the wedge outer surfaces 129a, 129b, can make up the two opposing forming surfaces 107. Molten glass can flow over the weirs 125a, 125b and down the forming surfaces 107 as two glass ribbons which can then fuse together at the root 109 to form a unitary glass ribbon 111. The ribbon can then be drawn down in direction 113 and, in some embodiments, further processed to form a glass sheet.

The forming body 100 can comprise any material suitable for use in a glass manufacturing process, for example, refractory materials such as zircon, zirconia, alumina, magnesium oxide, silicon carbide, silicon nitride, silicon oxynitride, xenotime, monazite, alloys thereof, and combinations thereof. According to various embodiments, the forming body may comprise a unitary piece, e.g., one piece machined from a single source. In other embodiments, the forming body may comprise two or more pieces bonded, fused, attached, or otherwise coupled together, for instance, the trough-shaped portion and wedge-shaped portion may be two separate pieces comprising the same or different materials. The dimensions of the forming body, including the length, trough depth and width, and wedge height and width, to name a few, can vary depending on the desired application. It is within the ability of one skilled in the art to select these dimensions as appropriate for a particular manufacturing process or system.

As illustrated in FIG. 3, an exemplary forming body 100 comprising an upper trough-shaped portion 102 and a lower wedge-shaped portion 104 can be equipped with pier blocks (or supports) 131, which may be in contact with, e.g., the lower wedge-shaped portion 104 of the forming body 100. The pier blocks 131, optionally in conjunction with back-up blocks 133, can be used to apply a compressive force $F_C$ to the forming body 100 as indicated by the arrows. Compressive force may be applied at both ends (as shown) or at one end only, with a supported opposite end. Pier seats (e.g., cut-outs or recesses) 135 can be present in the forming body 100, for receiving the pier blocks 131. The pier seats 135 can, for example, have a substantially square or rectangular shape and the pier blocks 131 can, in some embodiments, have a corresponding shape. As illustrated in FIG. 3, the pier blocks 131 can be chamfered or beveled to create discontinuous contact between the pier block and the pier seat, which is illustrated in more detail in FIGS. 4A-B and FIG. 5. The pier blocks and/or pier seats can also be curvilinear as will be described in detail below. The pier blocks and back-up blocks can comprise any material suitable for use in a glass manufacturing process, for example, refractory materials such as those described above with respect to the forming body, e.g., zircon, zirconia, alumina, magnesium oxide, silicon carbide, silicon nitride, silicon oxynitride, xenotime, monazite, alloys thereof, and combinations thereof. In other embodiments, the pier blocks and back-up blocks can comprise different materials than those used in a respective and adjacent forming body.

FIG. 4A depicts a slightly angled side view of an exemplary pier block 131 and back-up block 133. This view provides additional perspective with respect to a beveled surface of a pier block. The pier block 131 as depicted can comprise three planar surfaces: a horizontal support surface 137, a vertical support surface 139, and a chamfer or bevel surface 141. The horizontal support surface can be used to support the weight of the isopipe, whereas the vertical support surface can be used to apply a compressive force for sag mitigation.

FIG. 4B depicts a slightly angled side view of a corresponding pier seat 135 provided in a forming body. Two mounting surfaces (horizontal 143 and vertical 145) of the pier seat can be planar, corresponding to and in contact with the horizontal and vertical surfaces 137, 139 of the pier block. The pier seat can thus be substantially square or rectangular in shape. In some embodiments, the pier seat can comprise a third surface (fillet) 147 having a radius of curvature between the two mounting surfaces, which can provide stress relief. This radius in the pier seat (fillet) 147 can correspond to the bevel surface 141 of the pier block 131, which does not physically contact the fillet. The bevel or chamfer in the pier block can thus be used for clearance of the fillet in the pier seat between the horizontal and vertical support surfaces 137, 139.

The radial fillet 147 between the horizontal and vertical mounting surfaces 143, 145 can be a region of high localized stress. This stress can induce static fatigue in the refractory material, thus reducing the useful lifespan of the forming body. Thus, current pier block design may employ the bevel or chamfer, which can be sized proportionally to the fillet radius, to prevent contact between the pier seat and the pier block in this stressed region of the isopipe. However, in the configuration depicted in FIGS. 3-4, when the isopipe begins to sag due to thermal loading and/or creep during the fusion draw process, the contact surfaces (e.g., where 137 contacts 143 and where 139 contacts 145) may become misaligned, resulting in a reduced support area. The pier seat contact to the pier block may be gradually reduced over time to a small surface patch, which can in turn cause localized high stress on the forming body.

Figure 5:
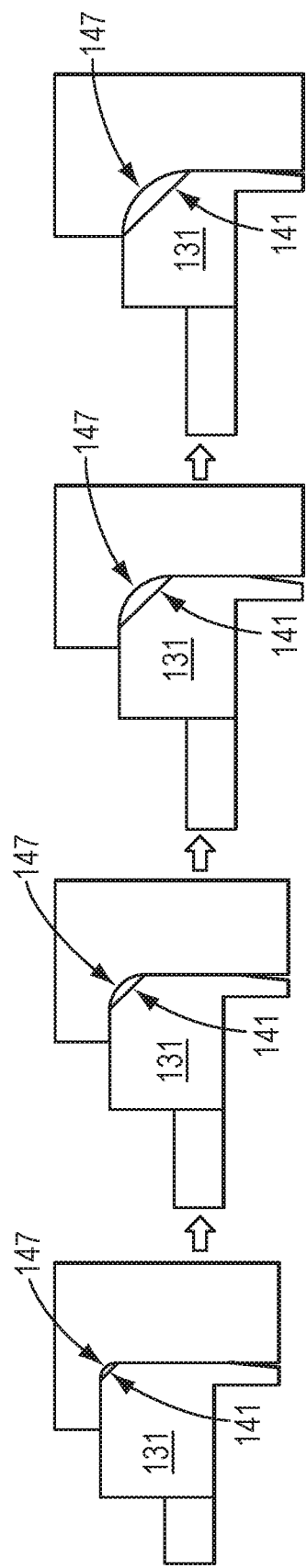
FIG. 5 is a schematic showing a side view of various exemplary pier blocks and pier seats.

To reduce stress in the pier seat region, an alternative configuration may include increasing the radius of the pier seat fillet 147 of the isopipe. However, as illustrated in FIG. 5, as the radius of the fillet 147 increases, the size of the chamfer surface 141 should also be increased to prevent contact between the pier block and the pier seat in the region of stress (fillet). The increased beveling results in smaller horizontal and vertical support surfaces, which can eventually negate any benefit associated with the increased radius of curvature of the fillet (e.g., decreased stress in the pier seat fillet 147 may be outweighed by decreased support area). This reduction in contact surface may also increase localized stress on support areas (where 137 contacts 143 and where 139 contacts 145).

FIG. 6 illustrates an alternative configuration for decreasing stress on the isopipe without sacrificing support surface area according to various embodiments of the disclosure. In FIG. 6, an exemplary forming body 200 (comprising an upper portion 202 and a lower portion 204) can be equipped with pier blocks (or supports) 231, which may be in contact with, e.g., the lower wedge-shaped portion 204 of the forming body 200. The pier blocks 231, optionally in conjunction with back-up blocks 233, can be used to apply a compressive force $F_C$ to the forming body 200 as indicated by the arrows. Again, compressive force can be applied to both ends or to one end only with an opposing support end (see, e.g., FIG. 8 with supported end 261). For example, compressive force may be applied by calibrated compression springs, clamps, or any other suitable devices or methods. Pier seats (e.g., cut-outs or recesses) 235 can be present in the forming body 200, for receiving the pier blocks 231. The pier blocks can be coupled to the pier seats, e.g., inserted at least partially into the recesses. One or both of the pier seats 235 can, for example, have a substantially rounded shape or contour and one or both of the corresponding pier blocks 231 can, in some embodiments, have a corresponding shape or contour, e.g., to provide full and continuous contact between the pier block and pier seat without gaps. For example, as illustrated in FIG. 6, the pier blocks 231 can comprise at least one non-planar surface portion 251 in continuous contact with a non-planar surface portion 253 of the pier seat, which is illustrated in more detail in FIGS. 7A-B.

According to various embodiments, the pier seat 235 can comprise a horizontal mounting surface portion (not illustrated), a fillet or non-planar surface portion 253, and a vertical mounting surface portion 255. In other embodiments, for example, as illustrated in FIG. 6, the pier seat 235 may not comprise a horizontal mounting surface portion or may not comprise a vertical mounting surface portion. Alternatively, the pier seat 235 may not comprise either a horizontal or a vertical mounting surface portion and may comprise only a non-planar fillet surface portion 253. The pier blocks 231 can also correspondingly comprise horizontal and/or vertical support surface portions, as desired to match the pier seat 235. In various non-limiting embodiments, by employing pier blocks having a radius of curvature, e.g., pier blocks with one or more rounded surfaces, the radius of curvature of the fillet portion 253 can be increased without sacrificing the contact surface area between the pier block 231 and the pier seat 235. The increased radius of curvature can decrease the tensile stress on the pier seat 235 without detrimentally decreasing the load-bearing support surface area, such that additional compressive force $F_C$ can be applied to the isopipe without increasing the risk of static fatigue failure.

As used herein, the term "continuous contact" is intended to denote a pier block surface and a pier seat surface in contact for a given length (e.g., more than a single point of contact) without gaps or periods of non-contact, e.g., a pier block and pier seat with at least partially matching contours. Thus, in FIGS. 4A-B, surfaces 137 and 143 (both planar) can be in continuous contact and surfaces 139 and 145 (both planar) can be in continuous contact. However, bevel surface 141 is not in continuous contact with the pier seat radial surface 147. Thus, the overall pier block surface (137+139+141) is not in continuous contact with the pier seat 135. In contrast, as shown in FIGS. 7A-B, surfaces 251 and 253 (both non-planar) can be in continuous contact and surfaces 255 and 257 (both planar) can be in continuous contact. Similarly, if horizontal mounting/support surfaces are present, they may also be in continuous contact. Thus, according to various embodiments, the overall pier block surface (251+257) can be in continuous contact with the pier seat 235. Of course, various surfaces of the pier block and pier seat may not be in continuous contact and/or there may be gaps present between one or more surfaces of the pier block and pier seat.

In additional embodiments, the pier block may comprise a constant radius that closely matches the radius of the pier seat, with continuous contact between the pier block and the pier seat along the radius of curvature. The radius of curvature of the pier seat (and the corresponding radius of curvature of the pier block) can vary as desired for a particular application, e.g., to minimize stress concentrations, and can range, in some embodiments, from about 2 cm to about 30 cm or greater, such as from about 2 cm to about 10 cm, from about 2 cm to about 30 cm such as from about 5 cm to about 28 cm, from about 8 cm to about 25 cm, from about 10 cm to about 23 cm, from about 13 cm to about 20 cm, or from about 15 cm to about 18 cm, including all ranges and subranges therebetween. Of course, while the various surfaces of the pier block and pier seat are depicted in FIGS. 6-7 as disposed at various angles and/or having various degrees of curvature, it is to be understood that these depictions are not limiting on the appended claims and any combination of these or other features can be used as desired.

When the isopipe begins to sag, as shown in FIG. 8, the contact surfaces between the pier seat and pier block can maintain alignment and the support area can be held relatively constant. The larger radius of curvature of the pier seat can also reduce the maximum stress in the pier seat. Any rotation R of the isopipe 200 due to creep-induced sag S can be mitigated by the rounded pier block surface such that the support surfaces can maintain full contact through the gradual rotation. As such, stress on the isopipe support region may be kept relatively low, which can increase the static fatigue life of the refractory material. Moreover, the rounded pier block design can, in some embodiments, allow for application of the compression force $F_C$ at a position further below the isopipe neutral axis, thus requiring less force to compensate for the sag. The lower compressive force will also reduce stress on the isopipe. Further, support for the isopipe weight and the root compression (sag mitigation) forces may all be carried through the same radial contact surface, which can result in reduced tensile stress on the isopipe, lower static fatigue, and/or longer isopipe life.

Methods

Disclosed herein are methods for producing a glass ribbon, the methods comprising melting batch materials to form molten glass and introducing the molten glass into an apparatus comprising a forming body comprising an upper trough-shaped portion comprising two trough walls and a trough bottom; a lower wedge-shaped portion; a delivery end comprising a first recess having a first mounting surface; and a compression end comprising a second recess having a second mounting surface; a first support coupled to the first recess and comprising a first support surface, wherein at least a portion of the first support surface is non-planar and in continuous contact with at least a portion of the first mounting surface; and a second support coupled to the second recess and comprising a second support surface, wherein at last a portion of the second support surface is non-planar and in continuous contact with at least a portion of the second mounting surface.

Embodiments of the disclosure will be discussed with reference to FIG. 9, which depicts an exemplary glass manufacturing system 300 for producing a glass ribbon 304. The glass manufacturing system 300 can include a melting vessel 310, a melting to fining tube 315, a fining vessel (e.g., finer tube) 320, a fining to stir chamber connecting tube 325 (with a level probe stand pipe 327 extending therefrom), a stir chamber (e.g., mixing vessel) 330, a stir chamber to bowl connecting tube 335, a bowl (e.g., delivery vessel) 340, a downcomer 345, and a FDM 350, which can include an inlet 355, a forming body (e.g., isopipe) 360, and a pull roll assembly 365.

Glass batch materials can be introduced into the melting vessel 310, as shown by arrow 312, to form molten glass 314. The fining vessel 320 is connected to the melting vessel 310 by the melting to fining tube 315. The fining vessel 320 can have a high temperature processing area that receives the molten glass from the melting vessel 310 and which can remove bubbles from the molten glass. The fining vessel 320 is connected to the stir chamber 330 by the fining to stir chamber connecting tube 325. The stir chamber 330 is connected to the bowl 340 by the stir chamber to bowl connecting tube 335. The bowl 340 can deliver the molten glass through the downcomer 345 into the FDM 350.

The FDM 350 can include an inlet 355, a forming body 360, and a pull roll assembly 365. The inlet 355 can receive the molten glass from the downcomer 345, from which it can flow to the forming body apparatus 360, where it is formed into a glass ribbon 304. Various embodiments of the forming body apparatus 360 are further described above, e.g., with reference to FIGS. 1-8. The pull roll assembly 365 can deliver the drawn glass ribbon 304 for further processing by additional optional apparatuses. For example, the glass ribbon can be further processed by a traveling anvil machine (TAM), which can include a mechanical scoring device for scoring the glass ribbon. The scored glass can then be separated into pieces of glass sheet, machined, polished, chemically strengthened, and/or otherwise surface treated, e.g., etched, using various methods and devices known in the art.

The term "batch materials" and variations thereof are used herein to denote a mixture of glass precursor components which, upon melting, react and/or combine to form a glass. The glass batch materials may be prepared and/or mixed by any known method for combining glass precursor materials. For example, in certain non-limiting embodiments, the glass batch materials can comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent.

According to various embodiments, the batch materials may comprise glass precursor materials, such as silica, alumina, and various additional oxides, such as boron, magnesium, calcium, sodium, strontium, tin, or titanium oxides. For instance, the glass batch materials may be a mixture of silica and/or alumina with one or more additional oxides. In various embodiments, the glass batch materials comprise from about 45 to about 95 wt % collectively of alumina and/or silica and from about 5 to about 55 wt % collectively of at least one oxide of boron, magnesium, calcium, sodium, strontium, tin, and/or titanium.

Figure 9:
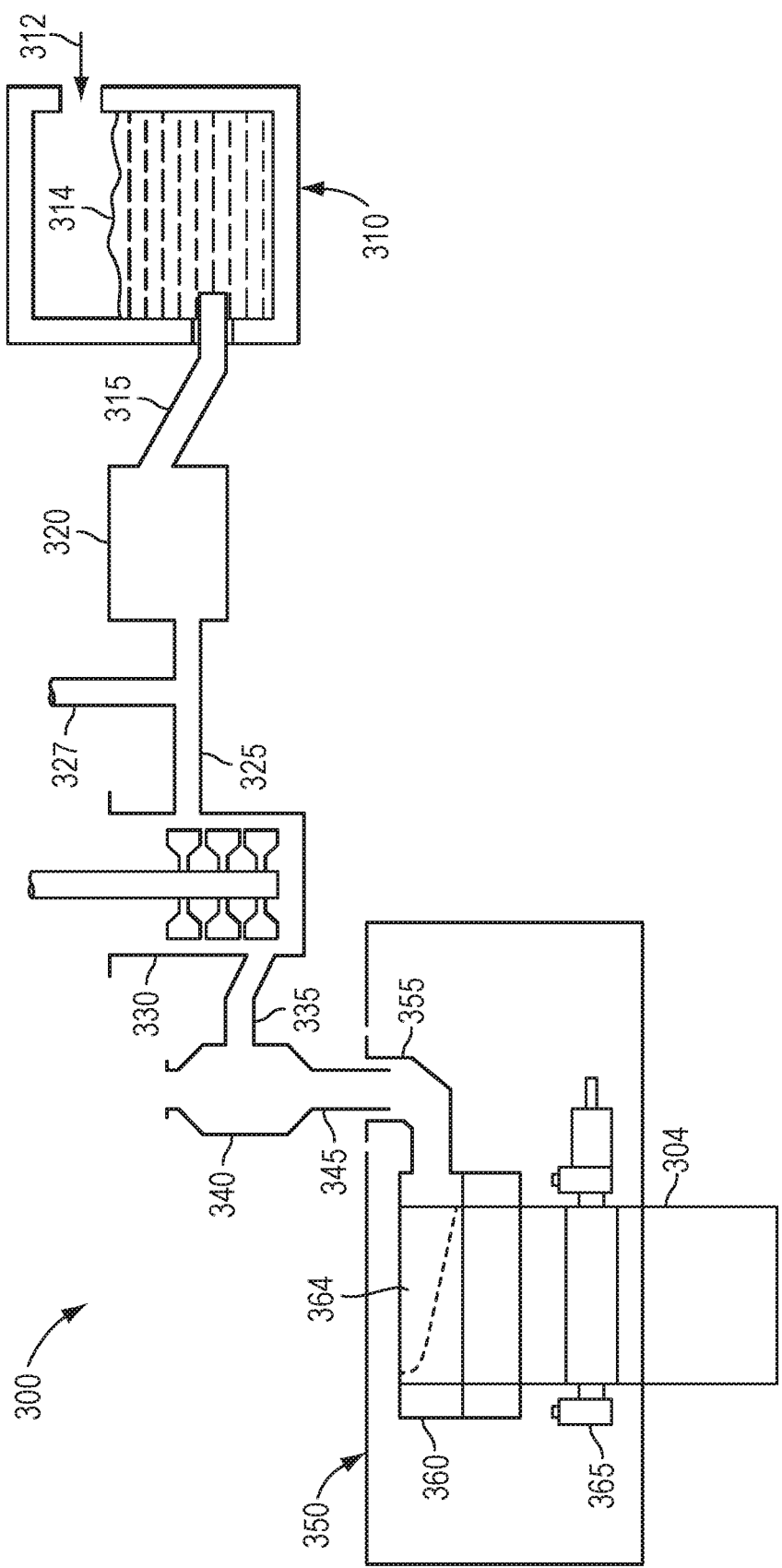
FIG. 9 illustrates an exemplary glass manufacturing system.

The batch materials can be melted according to any method known in the art, including the methods discussed herein with reference to FIG. 9. For example, the batch materials can be added to a melting vessel and heated to a temperature ranging from about 1100° C. to about 1700° C., such as from about 1200° C. to about 1650° C., from about 1250° C. to about 1600° C., from about 1300° C. to about 1550° C., from about 1350° C. to about 1500° C., or from about 1400° C. to about 1450° C., including all ranges and subranges therebetween. The batch materials may, in certain embodiments, have a residence time in the melting vessel ranging from several minutes to several hours, depending on various variables, such as the operating temperature and the batch size. For example, the residence time may range from about 30 minutes to about 8 hours, from about 1 hour to about 6 hours, from about 2 hours to about 5 hours, or from about 3 hours to about 4 hours, including all ranges and subranges therebetween.

The molten glass can subsequently undergo various additional processing steps, including fining to remove bubbles, and stirring to homogenize the glass melt, to name a few. The molten glass can then be processed to produce a glass ribbon using the forming body apparatuses disclosed herein. For example, as discussed above, the molten glass can be introduced into the trough-shaped portion of the forming body at the delivery end via one or more inlets. The glass can flow in a direction proceeding from the delivery end to the compression end, over the two trough walls, and down the two opposing outer surfaces of the wedge-shaped portion, converging at the root to form a unitary glass ribbon.

By way of a non-limiting example, the forming body apparatus may be enclosed in a vessel operating at a temperature ranging, at its hottest point (e.g., in an upper "muffle" region proximate the trough-shaped portion), from about 1100° C. to about 1350° C., such as from about 1150° C. to about 1325° C., from about 1150° C. to about 1300° C., from about 1175° C. to about 1250° C., or from about 1200° C. to about 1225° C., including all ranges and subranges therebetween. At its coolest point (e.g., in a lower "transition" region proximate the root of the forming body), the vessel may operate at a temperature ranging from about 800° C. to about 1250° C., such as from about 850° C. to about 1225° C., from about 900° C. to about 1200° C., from about 950° C. to about 1150° C., or from about 1000° to about 1100° C., including all ranges and subranges therebetween.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having two or more such components unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An apparatus for producing a glass ribbon, comprising:
   a forming body comprising:
      an upper trough-shaped portion comprising two trough walls and a trough bottom;
      a lower wedge-shaped portion;
      a delivery end comprising a first recess having a first mounting surface; and
      a compression end comprising a second recess having a second mounting surface;
   a first support coupled to the first recess and comprising a first support surface; and
   a second support coupled to the second recess and comprising a second support surface,
   wherein at least a portion of the first or second support surface is non-planar and in continuous contact with at least a portion of the respective first or second mounting surface; and
   wherein at least one of the first and second support surfaces does not comprise a planar portion.

2. The apparatus of claim 1, wherein at least a portion of the first support surface is non-planar and in continuous contact with at least a portion of the first mounting surface, and wherein at least a portion of the second support surface is non-planar and in continuous contact with at least a portion of the second mounting surface.

3. The apparatus of claim 1, wherein at least one of the first and second support surfaces has a substantially constant radius of curvature.

4. The apparatus of claim 3, wherein the radius of curvature of the first or second support surfaces independently ranges from about 2 cm to about 15 cm.

5. The apparatus of claim 1, wherein a contour of the first support surface substantially matches a contour of the first mounting surface, and wherein a contour of the second support surface substantially matches a contour of the second mounting surface.

6. The apparatus of claim 1, wherein the forming body and the first and second supports independently comprise a refractory material chosen from zircon, zirconia, alumina, magnesium oxide, silicon carbide, silicon nitride, silicon oxynitride, xenotime, monazite, alloys thereof, and combinations thereof.

7. A fusion draw machine comprising the apparatus of claim 1.

8. A method for producing a glass ribbon, comprising:
melting batch materials to form molten glass; and
introducing the molten glass into an apparatus according to claim 1.

9. The method of claim 8, further comprising applying a compressive force to at least one of the delivery end and the compression end of the forming body.

10. The method of claim 9, wherein the compressive force is applied below a neutral axis of the forming body.

11. An apparatus for producing a glass ribbon, comprising:
a forming body comprising:
an upper trough-shaped portion comprising two trough walls and a trough bottom;
a lower wedge-shaped portion;
a delivery end comprising a first recess having a first mounting surface; and
a compression end comprising a second recess having a second mounting surface;
a first support coupled to the first recess and comprising a first support surface; and
a second support coupled to the second recess and comprising a second support surface,
wherein at least a portion of the first or second support surface is in continuous contact with at least a portion of the respective first or second mounting surface; and
wherein at least one of the first or second support surfaces consists of a planar portion and at least one non-planar portion.

12. The apparatus of claim 11, wherein the planar portion is a vertical support surface portion.

13. The apparatus of claim 11, wherein at least one non-planar portion of the first support surface is in continuous contact with at least a portion of the first mounting surface, and wherein at least one non-planar portion of the second support surface is in continuous contact with at least a portion of the second mounting surface.

14. The apparatus of claim 11, wherein the at least one non-planar portion of at least one of the first or second support surfaces has a substantially constant radius of curvature.

15. The apparatus of claim 14, wherein the radius of curvature ranges from about 2 cm to about 15 cm.

16. The apparatus of claim 11, wherein the non-planar and planar portions of the first and second support surfaces are in continuous contact with the respective first and second mounting surfaces.

17. The apparatus of claim 11, wherein the planar portion of the first or second support surface is chosen from horizontal and vertical support surface portions.

18. The apparatus of claim 11, wherein a contour of the first support surface substantially matches a contour of the first mounting surface, and wherein a contour of the second support surface substantially matches a contour of the second mounting surface.

19. The apparatus of claim 11, wherein the forming body and the first and second supports independently comprise a refractory material chosen from zircon, zirconia, alumina, magnesium oxide, silicon carbide, silicon nitride, silicon oxynitride, xenotime, monazite, alloys thereof, and combinations thereof.

20. A fusion draw machine comprising the apparatus of claim 11.

21. A method for producing a glass ribbon, comprising:
melting batch materials to form molten glass; and
introducing the molten glass into an apparatus according to claim 11.

22. The method of claim 21, further comprising applying a compressive force to at least one of the delivery end and the compression end of the forming body, wherein the compressive force is applied below a neutral axis of the forming body.

* * * * *